United States Patent
Cho et al.

(10) Patent No.: US 10,803,996 B2
(45) Date of Patent: Oct. 13, 2020

(54) PLASMA DIAGNOSIS SYSTEM USING MULTIPLE-RECIPROCATING-PASS THOMPSON SCATTERING

(71) Applicant: INDUSTRY-UNIVERSITY COOPERATION FOUNDATION SOGANG UNIVERSITY, Seoul (KR)

(72) Inventors: Kyu Man Cho, Seoul (KR); June Gyu Park, Seoul (KR); Seung Hyun Yoon, Seoul (KR); Wha-Keun Ahn, Andong-si (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 0 days.

(21) Appl. No.: 16/519,588

(22) Filed: Jul. 23, 2019

(65) Prior Publication Data

US 2019/0378625 A1  Dec. 12, 2019

Related U.S. Application Data

(63) Continuation-in-part of application No. 16/068,268, filed as application No. PCT/KR2016/003953 on Apr. 15, 2016, now abandoned.

(30) Foreign Application Priority Data

Jan. 8, 2016 (KR) .................. 10-2016-0002627

(51) Int. Cl.
*G21B 1/23* (2006.01)
*G02B 27/10* (2006.01)
(Continued)

(52) U.S. Cl.
CPC .................. *G21B 1/23* (2013.01); *G01J 3/02* (2013.01); *G02B 27/10* (2013.01); *G02B 27/283* (2013.01);
(Continued)

(58) Field of Classification Search
CPC ...................................... G21B 1/057
See application file for complete search history.

(56) References Cited

U.S. PATENT DOCUMENTS 5,760,388 A  6/1998  Swandic
2009/0231583 A1  9/2009  Smith

FOREIGN PATENT DOCUMENTS

JP  05312712  11/1993
JP  06102086  4/1994
(Continued)

OTHER PUBLICATIONS

Kelly Warner,"Thomson scattering from analytical plasmas", 2002,Elsevier Science (Year: 2002).*
(Continued)

*Primary Examiner* — Maurice C Smith
(74) *Attorney, Agent, or Firm* — Cantor Colburn LLP

(57) ABSTRACT

Provided is a plasma diagnosis system using multiple-reciprocating-pass Thompson scattering. The plasma diagnosis system includes: a laser which supplies laser pulses; an optical system configured to make the laser pulse multiple roundtrips, focus the laser pulse to a predetermined position, rotate the plane of polarization by 90 degrees in every completion of the roundtrip; a collection optics which collects lights scattered from the focused region in plasma, 'first collected scattering' by the vertical polarization of the laser pulse and 'second collected scattering' by the horizontal polarization of the laser pulse; a polychromator which filters the collected lights provided from the collection optics according to spectral characteristics and output the filtered lights; and a computer which measures spectral characteristics of the first and second collected scatterings by using the filtered lights and outputs Thomson scattering signal with the background noise and the background noise without Thomson scattering signal.

7 Claims, 3 Drawing Sheets

(51) Int. Cl.
  *G01J 3/02* (2006.01)
  *G02B 27/28* (2006.01)
  *G21K 1/10* (2006.01)
  *G21B 1/05* (2006.01)
(52) U.S. Cl.
  CPC .............. *G21K 1/10* (2013.01); *G21B 1/057* (2013.01); *Y02E 30/122* (2013.01)

(56) References Cited

FOREIGN PATENT DOCUMENTS

| | | |
|---|---|---|
| JP | 2003240715 | 8/2003 |
| JP | 3699682 | 9/2005 |
| KR | 20130099641 | 9/2013 |

OTHER PUBLICATIONS

N. Bretz, "Multichannel Thomson scattering apparatus", 1978 Applied Optics (Year: 1978).*
European Search Report—European Application No. 16883938.9, dated Jun. 7, 2019, citing Yoshikawa, Yasuhara, JP 2003 240715 and Togashi.
International Search Report—PCT/KR2016/003953 dated Oct. 6, 2016.
Togashi, et al., Thomson scattering measurements in low-density plasmas in the TST-2 spherical tokamak, J. Inst., 2015, pp. 1-9.
Yasuhara, et al., Design of the polarization multi-pass Thomson scattering system, Review of Scientific Instruments, 2012, pp. 10E326-1-10E326-3.
Yoshikawa, et al., Development of polarization-controlled multi-pass Thomson scattering system in the GAMMA 10 tandem minor, Review of Scientific Instruments, 2012, pp. 10E333-1-10E333-3.

* cited by examiner

PLASMA DIAGNOSIS SYSTEM USING MULTIPLE-RECIPROCATING-PASS THOMPSON SCATTERING

TECHNICAL FIELD

The present invention relates to a plasma diagnosis system using Thomson scattering, and more particularly, a plasma diagnosis system using multiple-reciprocating-pass Thompson scattering system can capable of rejecting background noise due to stray lights and measuring an pure Thomson scattering signal without noise by measuring a Thomson scattering signal and a background noise in plasma by using an optical system configured to rotate a plane of polarization of a multi-passing laser pulse by 90 degrees in every consecutive roundtrip.

BACKGROUND ART

In tokamak-type nuclear fusion, typically, deuterium atoms and tritium atoms are heated up to so high temperature to generate a plasma state in which ionized atomic nuclei and electrons have free mobility, and the plasma is confined by using a strong toroidal magnetic field, so that the nuclei overcome Coulomb force and come close enough to cause fusion reaction at sufficiently high temperature. In order to stably operate and control this high-temperature, high-density plasma state, it is necessary to know the temperature and density of the plasma, and thus, accurate measurement thereof is required. As a result of this request, various types of plasma diagnosis apparatuses have been developed and used. As one of the plasma diagnosis apparatuses, there is a diagnosis apparatus using Thomson scattering, which is an essential diagnosis apparatus for measuring temperature and density of electrons.

FIG. 1 is a configuration diagram schematically illustrating a diagnosis apparatus using Thompson scattering in the related art for diagnosing a state of plasma in a tokamak of a nuclear fusion reactor.

Referring to FIG. 1, a diagnosis apparatus 1 using Thomson scattering in the related art for diagnosing a state of plasma in a tokamak 5 of a nuclear fusion reactor includes a laser which outputs a strong laser pulse linearly polarized in the direction perpendicular to the plane containing the propagation vector of the laser pulse and the optic axis of the collection optics 130, which will be referred as the vertical direction, an optical system 110 which focuses the vertically polarized laser pulses beam in the vertical polarization state into a prescribed position of the plasma in the TOKAMAK, a laser beam dump 120 which is mounted outside the tokamak and absorbs and removes the used laser pulses, and a collection optics 130 which collects the light scattered by the plasma in the focused region of the laser pulses.

More specifically, in order to measure the temperature and density of electrons in a plasma, the above-described diagnosis apparatus 1 using Thomson scattering focuses a high energy laser pulse with a single wavelength (1064 nm, for example) from the outside of the tokamak 5 into the plasma-filled tokamak by using the laser 100 and the optical system 110. The positively charged ions or nuclei in a fusion reactor, and electrons constituting the plasma are accelerated by the oscillating electric field of the focused high intensity, linearly polarized laser pulse. At the driving laser frequency, accelerated charges, mainly electrons, radiate lights, for which a light beam with the same frequency as the incident laser beam is emitted and is subjected to Thompson scattering. As a consequence, the Thomson scattering has the largest cross section along the direction perpendicular to the oscillating electrons or the direction of incident polarization and there is no radiation along the direction parallel to the polarization. Therefore, the maximum collection efficiency can be expected along the optic axis of the collection optics, if the plane of polarization of the incident laser pulse is orthogonal to the plane containing the laser pulse propagation vector and the optic axis of the collection optics, which will be referred to as the vertical polarization.

On the contrary, in the case where the polarization of the incident laser pulse is horizontal, or 90 degrees to the vertical polarization, Thomson scattering to the collection optics is negligible.

Since high temperature plasmas are moving fast, the scattered lights do a Doppler shift in wavelength due to the Doppler effect. Therefore, the diagnosis apparatus using Thomson scattering can acquire the temperature of electrons in plasma by measuring the wavelength shift due to the Doppler effect and can also acquire the density of electrons according to the intensity of light to be measured. That is, if signals of the Thomson scattered light in plasma are accurately measured, the temperature and density of the plasma can be accurately acquired.

However, there exist the light beams that are reflected by incomplete optical parts to be incident on the tokamak and the light beams that are scattered multiple times by wall surfaces of the tokamak and the like, and these light beams are called stray light.
As the background noise caused by the stray light is included in the Thomson scattering signal measured by the diagnosis apparatus using Thomson scattering in the related art, there is a problem in that the accuracy of the measured Thompson scattering signal is lowered.

SUMMARY OF THE INVENTION

Technical Problem

In order to solve the problems described above, the present invention is to provide a plasma diagnosis system using a multiple-reciprocating-pass Thompson scattering system which can reject background noise due to stray lights by rotating the plane of polarization of the laser pulse by 90 degrees at every roundtrip in the multiple-reciprocating-pass.

Solution to Problems

According to an aspect of the present invention, there is provided a plasma diagnosis system using Thomson scattering, including: a laser which outputs a laser pulse having predetermined polarization and wavelength; an optical system configured to run the laser pulse along the given path multiple times, rotates a plane of polarization of the laser pulse by 90 degrees in each roundtrip, and focuses the laser pulse to a predetermined location in the plasma in order to provide alternately vertical and horizontal polarizations of the laser pulse to a focal point in plasma; a collection optics which is configured with a lens or a combination of lenses, collects lights scattered from a focal point in plasma, whereas the collected light by the vertical polarization of the laser pulse is referred to as 'first collected scattering' and the collected light by the horizontal polarization of the laser pulse is referred to as 'second collected scattering'; a polychromator which filters and outputs spectral characteristics of the first and second collected scatterings; and a computer which measures spectral characteristics of the first and second collected scatterings and outputs a background noise and a Thomson scattering signal with the background noise, wherein the noise is generated by scattering in plasma due to stray lights and is obtained from the second collected scattering and the Thomson scattering signal with the noise is obtained from the first collected scattering.

Preferably, in plasma diagnosis system using Thomson scattering according to the above aspect, the optical system may include: a polarizing beam splitter (PBS) which is inserted in the optical path and reflects or transmits an incident laser pulse according to a polarization state of the incident laser pulse; a first reflecting mirror (M1) which reflects the laser pulse exited from the PBS back into the incident optical path; a Faraday rotator which rotates a plane of polarization of the output laser pulse from the PBS by 45 degrees; a focusing lens which focuses the output laser pulse from the Faraday rotator to the predetermined position in plasma; and a second reflecting mirror (M2) which reflects the laser pulse exited from the focal point in plasma to the focusing lens, and wherein the vertical polarization of the laser pulse and the horizontal polarization of the laser pulse are alternately focused into the focal point in plasma.

Preferably, the plasma diagnosis system using Thomson scattering according to the above aspect, may further include an optical isolator between the laser and the optical system, and wherein the optical isolator prevents any back reflected lights from feeding back into the laser.

Preferably, the plasma diagnosis system using Thomson scattering according to the above aspect, may further include a trigger module which is configured with a photo detector and outputs a trigger signal when the photo detector detects a part of the laser pulse on a predetermined position, wherein a signal processing of the polychromator is synchronized by using the trigger signal.

Preferably, the plasma diagnosis system using Thomson scattering according to the above aspect, further comprises a computer which measures a pure Thomson scattering signal without the background noise by subtracting the background noise from the Thomson scattering signal contaminated with the background noise.

Preferably, the plasma diagnosis system using Thomson scattering according to the above aspect may be applied to a tokamak-type nuclear fusion reactor, wherein the optical system focuses a laser pulse into a predetermined region of the confined plasma in the tokamak, the collection optics collects the scattered lights and sends the collected lights to a polychromator by using a transmission link, typically an optical fiber.

A computer interfaced high-speed multi-channel data analyzer is used for subtracting the background noise from the Thomson scattering signal contaminated with the noise and analyzing the output signals from the different channels of the polychromator to provide correct information on the temperature and density of electrons at the focused region of hot plasma. The computer measures and supplies the pure Thomson scattering signal without noise in the tokamak.

Effects of the Invention

The multiple-reciprocating-pass plasma diagnosis system according to the present invention alternately supplies a vertical polarization of a laser pulse and a horizontal polarization of a laser pulse to a tokamak using the optical system to be focused in plasma through multiple reciprocating paths, so that it is possible to measure and supply the pure Thomson scattering signal from which the background noise is removed.

BEST MODE FOR CARRYING OUT THE INVENTION

In a plasma diagnosis system using Thomson scattering according to the present invention, a vertical polarization of a laser pulse and a horizontal polarization of a laser pulse are alternately supplied in plasma of a tokamak in a nuclear fusion reactor through multiple reciprocating paths, and scattering signals in plasma of the tokamak are collected and measured, so that it is possible to accurately measure a pure Thomson scattering signal from which a background noise is removed.

Hereinafter, a structure and operation of a plasma diagnosis system using Thompson scattering according to a preferred embodiment of the present invention will be described in detail with reference to the accompanying drawings.

Figure 1:
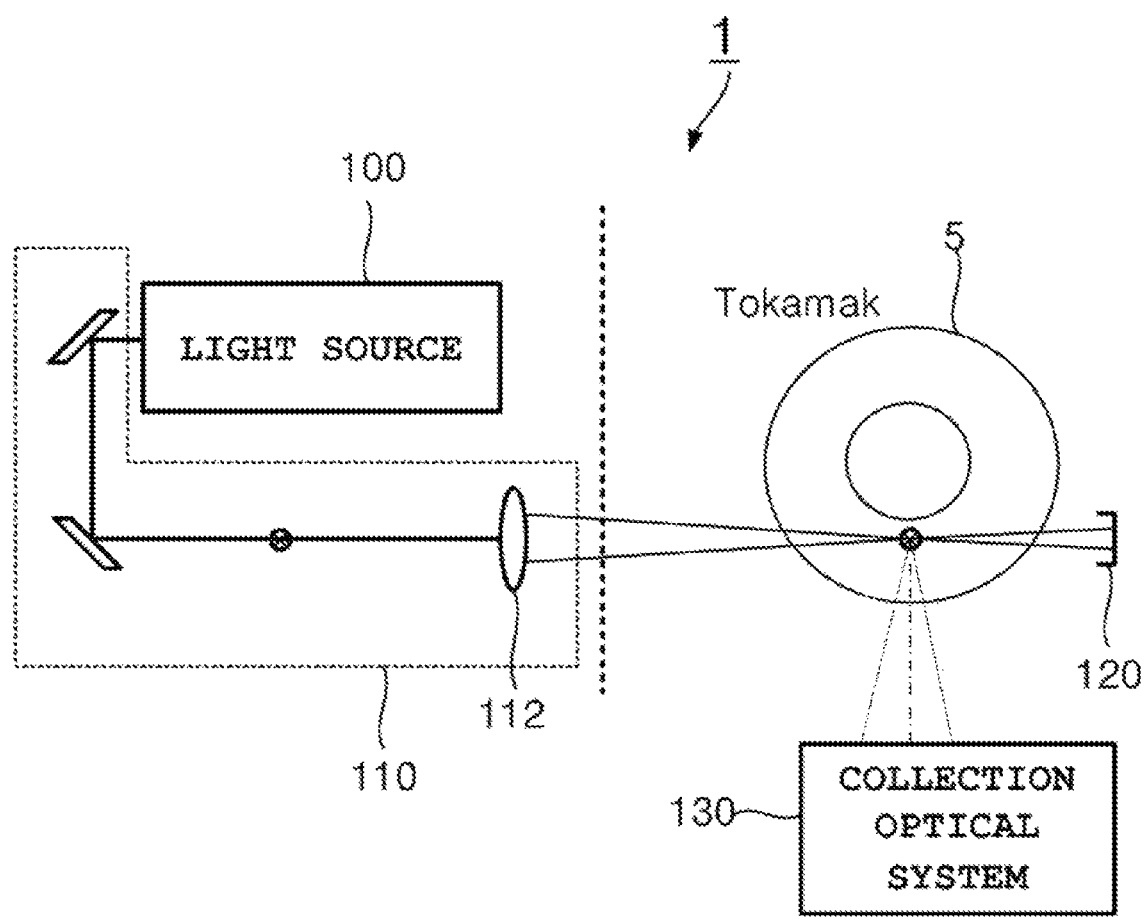
FIG. 1 is a configuration diagram schematically illustrating a diagnosis apparatus using single-path Thompson scattering in the related art for diagnosing a state of plasma in a tokamak of a nuclear fusion reactor.
Figure 2:
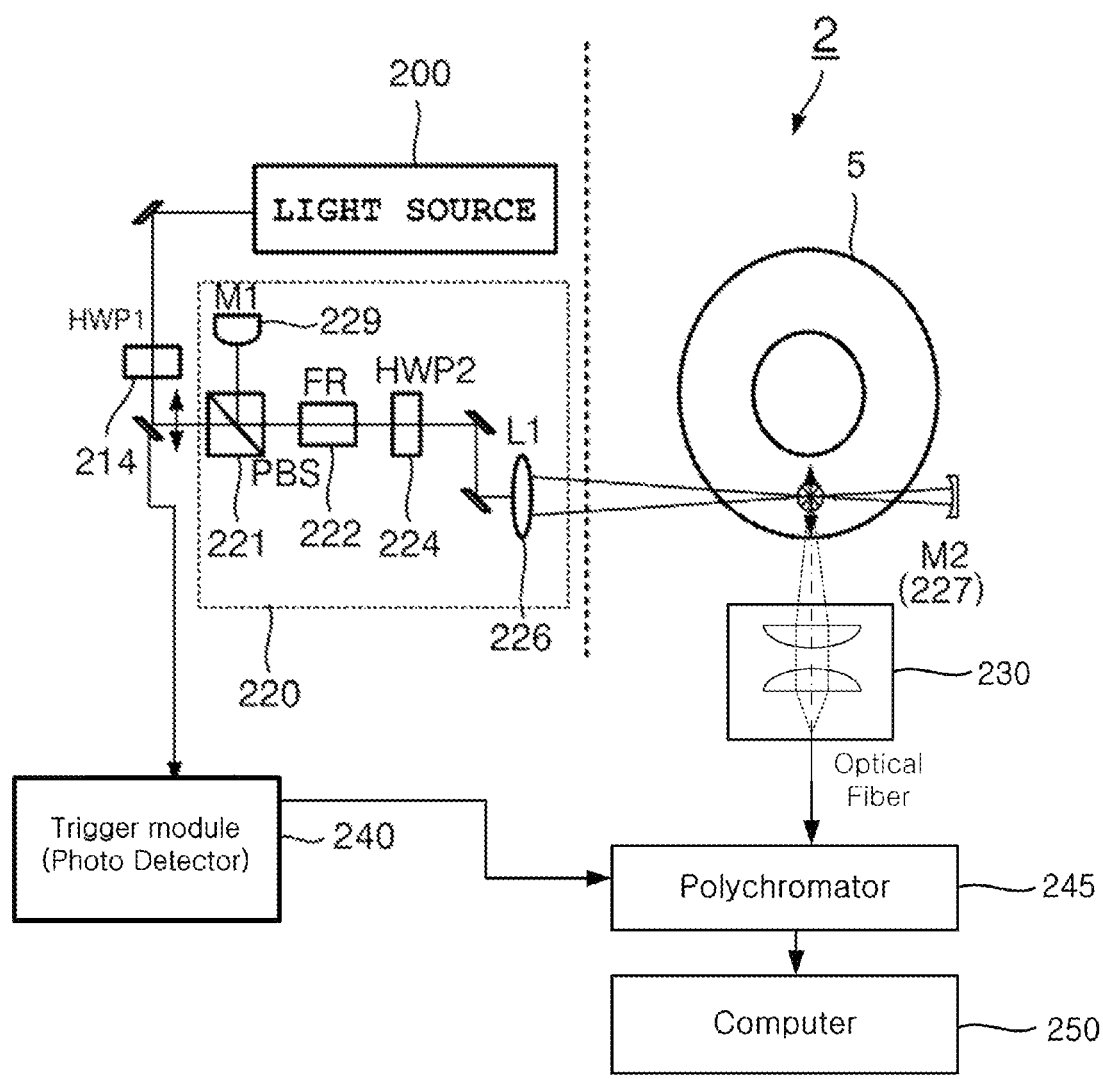
FIG. 2 is a configuration diagram schematically illustrating a plasma diagnosis system using multiple-reciprocating-path Thomson scattering according to a preferred embodiment of the present invention.

FIG. 2 is a block diagram schematically illustrating a plasma diagnosis system using multiple-reciprocating-path Thompson scattering according to a preferred embodiment of the present invention.

Referring to FIG. 2, a plasma diagnosis system 2 according to the present invention is installed outside a tokamak 5 of a nuclear fusion reactor and includes a laser 200, an optical system 220 which sequentially and alternately supplies a vertical polarization of the laser pulse and a horizontal polarization of the laser pulse to plasma of the tokamak, a collection optics 230 which collects lights scattered in plasma of the tokamak, a trigger module 240, a polychromator 245 and a computer 250.

The laser 200 outputs a laser pulse in a horizontal polarization with a single wavelength of 1064 nm and a strong electric field intensity.

The first half wave plate (HWP) 214 is disposed on the optical path of the laser pulse output from the laser and rotated a plane of a polarization of the incident laser pulse by 90 degrees to select and maintain the polarization state of the propagating laser pulse.

The optical system 220 is configured to run the laser pulse to passes along a closed optical path, focus and collimate the laser pulse in plasma when enters and exits a plasma vessel, respectively, place a predetermined focal point in plasma, and rotate a plane of polarization by 90 degrees at each complete pass to provide and focus alternately horizontal and vertical polarizations of the laser pulse to the predetermined focal point in plasma. The optical system 220 is located between the laser and the tokamak 5 to supply and focus alternately a vertical polarization of the laser pulse and a horizontal polarization of the laser pulse to plasma in the tokamak when the laser pulse is supplied from the laser. The optical system is configuring to alternately focus the vertical and horizontal polarizations of the laser pulse on the focal point in plasma.

The optical system 220 includes a polarizing beam splitter (PBS) 221, a Faraday rotator (FR) 222, a second half wave plate (HWP) 224, and a focusing lens 226, a second reflecting mirror 227, and a first reflecting mirror 229.

The second reflecting mirror 227 includes a lens, a convex lens or a combination of lenses 227 may be installed inside or outside the tokamak. The second reflecting mirror 227 is configured to reflect the laser pulse exited from the focal point in plasma to the focusing lens.

The first reflecting mirror 229 includes a lens, a convex lens or a combination of lenses and is inserted in the optical path and reflects the laser pulse exited from the PBS back into the optical path.

The polarizing beam splitter (PBS) 221 is inserted in the optical path and reflects or transmits an incident laser pulse according to a polarization state of the incident laser pulse. The PBS transmits the horizontal polarization of the laser pulse and reflects the vertical polarization of the laser pulse. Therefore, the laser pulse having two polarization components may be split to two paths by passing through the PBS.

The focusing lens 226 focuses the laser pulse output from the Faraday rotator on the predetermined focal point in plasma. When the laser pulse is focused into the focal point in plasma of the tokamak by the focusing lens, the first Thomson scattering is strongly generated in the direction of the collection optic. As a result, the first-1 collection signal, in which the noise and the Thomson scattering signal are mixed, is collected by the collection optics 230 and is transmitted to a polychromator using optical fibers, by which the collection signal is measured for each wavelength band. The Faraday rotator 222 rotates a plane of polarization of the laser pulse passing through the PBS by 45 degrees. The Faraday rotator 222, the second half wave plate 224, and the focusing lens 226 are sequentially disposed on the optical path of the laser pulse passing through the PBS 220. The second half wave plate 224 rotates a plane of polarization of the incident laser pulse by 90 degrees, so that the horizontal polarization of the laser pulse is convert to the vertical polarization by the Faraday rotator 222 and the second half wave plate 224. The first half wave plate 214 may be omitted in the case where the laser pulse output from the laser is a perfectly horizontal polarization. In some cases, in principle, the second half wave plate 224 may be omitted according to the position of a Thomson scattering collection unit.

The collection optics 230 is comprising of a lens or a combination of lenses and collects the lights scattered from the focal points in plasma and supplies the collected lights to the polychromator 245.

The collected light is referred to as "first collected scattering" if the plane of polarization of the laser pulse is orthogonal (referred to as "vertical polarization of the laser pulse") to the plane containing optic axis of the collection optics and the propagation vector of the laser pulse. In addition, the collected light is referred to as "second collected scattering" if the plane of polarization of the laser pulse is parallel (referred to as "horizontal polarization of the laser pulse") to the plane containing optic axis of the collection optics and the propagation vector of the laser pulse. Thomson scattered lights are contaminated with the noise due to stray lights in the first collected scattering while the noise due to stray lights are dominant in the second collected scattering. The trigger module 240 generates the trigger signals and outputs the trigger signals to the collection optics and/or the computer when the horizontal polarization of the laser pulse and the vertical polarization of the laser pulse are supplied from the optical system. The trigger module may detect an extra laser beam signal transmitted through a folding mirror disposed at a trigger point set between the laser and the optical system or at an arbitrary position of the optical system to use the extra laser beam signal as a trigger signal.

The collection optics is driven according to the trigger signal output from the trigger module to collect light scattered in the tokamak and supply the scattered light.

The polychromator 245 may be consisted of typically 5 channels of broad band pass filters which can be used for analyzing spectral characteristics of the lights, which are the first and second collected scatterings. Each channel of the polychromator filters the collected lights provided from the collection optics according to spectral characteristics and outputs the filtered lights.

Therefore, the polychromator output the filtered lights according to spectral characteristics of the collected lights to the data acquisition system 250 through the 5 channels.

The data acquisition system 250 may be included amplifiers and a computer which measures and analyses spectral characteristics of the first and second collected scatterings by using the filtered signal provided from the polychromator and measures a pure Thomson scattering signal by using the spectral characteristics. The computer of the data acquisition system 250 measures and supplies a pure Thomson scattering signal without the background noise by using the first and second collected scatterings.

The computer may measure temperature and density of electrons in plasma by analyzing the spectral characteristics obtained in the polychromator.

More specifically, the computer controls to generate the Thomson scattering on the plasma in the tokamak by the vertical polarization of the laser pulse and measures the Thomson scattering signal which is contaminated with the noise. In addition, the computer controls not to generate the Thomson scattering on the plasma in the tokamak by the horizontal polarization of the laser pulse and measures a noise which is scattered from plasma due to stray lights. Therefore, the computer can accurately measure the pure Thomson scattering signal without the noise due to stray lights by removing the noise from the Thompson scattering signal with the noise.

Hereinafter, the operation of the plasma diagnosis system using multiple-reciprocating-path Thompson scattering having the above-described configuration according to the preferred embodiment of the present invention will be described in detail with reference to FIG. 3. In plasma diagnosis system according to the preferred embodiment of the present invention, when the laser pulse is output from the laser, the laser pulse is reciprocated four times through the optical system, so that Thompson scatterings are generated in plasma.

Figure 3:
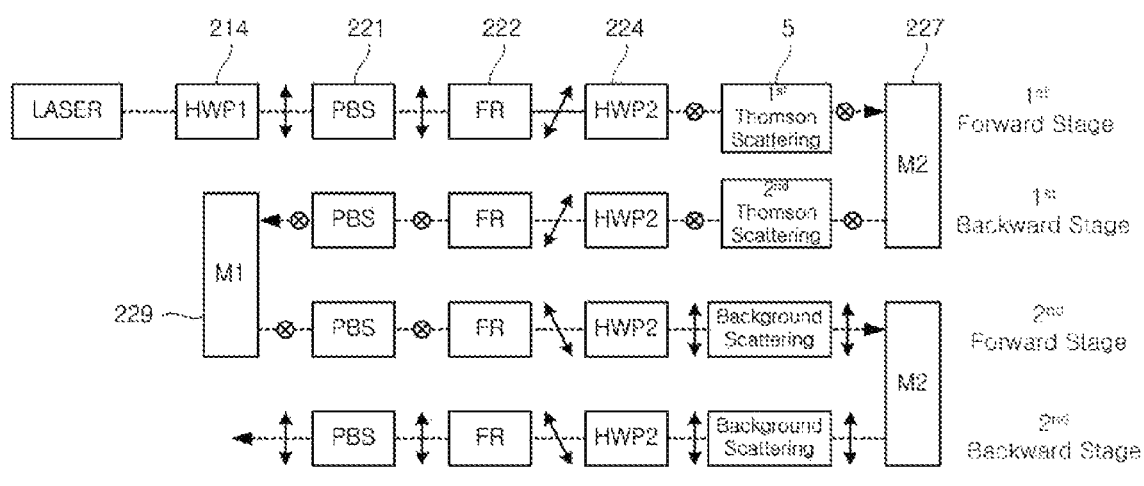
FIG. 3 is a diagram illustrating a polarization state of a laser pulse in each stage in plasma diagnosis system using multiple-reciprocating-path Thomson scattering according to the preferred embodiment of the present invention.
Figure 3:
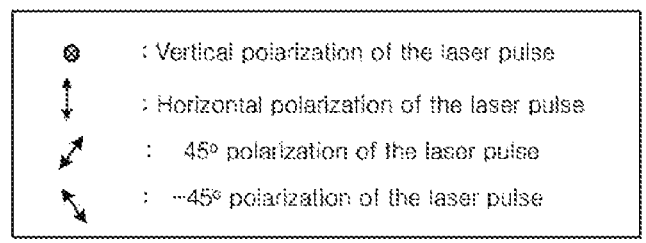

Hereinafter, FIG. 3 is a diagram illustrating a polarization state of the laser pulse in each stage in plasma diagnosis system using multiple-reciprocating-path Thompson scattering according to the preferred embodiment of the present invention.

Referring to FIG. 3, when a horizontal polarization of a laser pulse is output and supplied from the laser, in the first forward stage, the laser pulse passes through the PBS 221, passes through the FR 222 to be rotated the plane of the polarization of the laser pulse by 45 degrees, and is rotated by 45 degrees again by the second HWP 224, so that the polarization of the laser pulse is converted to the vertical polarization. When the vertical polarization of the laser pulse is focused on the focal point in plasma of the tokamak, the first Thomson scattering is strongly generated in the direction of the collection optics 230. As a result, the collection optics collects a light scattered from the focal point in plasma and sends the collected light to the polychromator as the first-1 collection signal due to the first Thompson scattering. The first-1 collection signal due to the first Thompson scattering is configured with the Thomson scattering signal with the noise which the Thomson scattering signal is contaminated with the background noise due to stray lights.

Next, the laser pulse focused on the focal point of the plasma propagates after the first Thompson scattering and is reflected by the second reflecting mirror 227, and then the first backward stage proceeds.

In the first backward stage, as the laser pulse is refocused into the focal point of plasma of the tokamak, the second Thomson scattering is generated. The collection optics collects a light scattered from the focal point in plasma and sends the collected light to the polychromator as the first-2 collection signal due to the second Thompson scattering. The first-2 collection signal due to the second Thompson scattering is configured with the Thomson scattering signal with the noise.

Next, in the first backward stage, the vertical polarization of the laser pulse passing through the tokamak passes through the second HWP 224 and is rotated by 45 degrees in the backward direction, and returns to the original state and a plane of the polarization of the laser pulse is rotated by 45 degrees by the FR 222 again, so that the polarization of the laser pulse is converted to the vertical polarization.

The vertical polarization of the laser pulse is reflected by the PBS 221 and propagates to the first reflecting mirror 229. The vertical polarization of the laser pulse reflected by the first reflecting mirror is incident on the PBS 221 again and then reflected.

Next, in the second forward stage, the vertical polarization of the laser pulse incident on the PBS from the first reflecting mirror is reflected by the PBS and then passes through the FR 222 so that the plane of the polarization of the laser pulse is rotated by 45 degrees. The polarization of the laser pulse is converted to the horizontal polarization by the second HWP 224.

As the horizontal polarization of the laser pulse is focused on the focal point of the plasma, Thomson scattering is not generated in the direction of the collection optics 230, and a background scattering due to stray lights is generated. Therefore, the collection optics collects a light scattered from the focal point in plasma by the background scattering and sends the collected light to the polychromator as the second-1 collection signal due to the background scattering. The second-1 collection signal is configured with only the background noise which is a light scattered from the focal point of the plasma due to the stray lights.

Next, the laser pulse focused on the focal point of the plasma propagates and is reflected by the second reflecting mirror 227, and the second backward stage proceeds.

In the second backward stage, the horizontal polarization of the laser pulse is focused again on the focal point of the plasma and then propagates to the focusing lens with no Thomson scattering in the direction of the collection optics 230. The background scattering due to stray lights is generated in the focal point of the plasma. At this time, the collection optics collects a light scattered from the focal point in plasma and sends the collected light to the polychromator as the second-2 collection signal due to the background scattering. The polychromator and the computer measure the second-2 collection signal configured with only the noise.

The computer receives the first-1 and first-2 collection signals which are configured with the Thomson scattering signal contaminated with the noise and receives the second-1 and second-2 collection signals which are configured with only the noise. Therefore, it is possible to accurately measure the pure Thomson scattering signal without the noise by subtracting the background noise from the Thomson scattering signal contaminated with the background noise.

As described above, the plasma diagnosis system using the multiple-reciprocating-path Thomson scattering according to the present invention can accurately measure the Thomson scattering signal.

On the other hand, the plasma diagnosis system according to the present invention can be applied to a tokamak-type nuclear fusion reactor. In this case, the optical system focuses the laser pulse into the tokamak, the collection optics collects the scattered optical signals in the tokamak, and the computer measures the pure Thomson scattering signal without the noise in the tokamak.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

INDUSTRIAL APPLICABILITY

The plasma diagnosis system according to the present invention can be used variously in apparatuses requiring measurement of the temperature and density of plasma, and in particular, can be used to diagnose the state of plasma inside a tokamak-type nuclear fusion reactor.

The invention claimed is:

1. A plasma diagnosis system using multiple-pass Thomson scattering, comprising:
    a laser which supplies a laser pulse having predetermined polarization state and wavelength;
    an optical system configured to make the laser pulse travel multiple roundtrips along a predetermined optical path and focus the laser pulse to a predetermined location in plasma, and rotate a plane of polarization by 90 degrees after each complete roundtrip;
    a collection optics which is configured with a lens or a combination of lenses, collects lights scattered from a focal point in plasma, whereas the collected light by the vertical polarization of the laser pulse is referred to as 'first collected scattering' and the collected light by the horizontal polarization of the laser pulse is referred to as 'second collected scattering';
    a polychromator which is consisted of multiple channels of band pass filters which filter the collected lights provided from the collection optics according to spectral characteristics and output the filtered lights;
    a computer which measures spectral characteristics of the first and second collected scatterings by using the filtered lights provided from the polychromator and outputs a Thomson scattering signal contaminated with a background noise and the background noise, respectively, wherein the background noise is generated by scattering in plasma due to stray lights and is obtained from the second collected scattering, and the Thomson scattering signal contaminated with the background noise is obtained from the first collected scattering.

2. The plasma diagnosis system according to claim 1, wherein the optical system includes:
   a polarizing beam splitter (PBS) which is inserted in the predetermined optical path and reflects or transmits an incident laser pulse according to a polarization state of the incident laser pulse;
   a first reflecting mirror which is inserted in the optical path and reflects the laser pulse exited from the PBS back into the optical path;
   a Faraday rotator which rotates a plane of polarization of the laser pulse passing through the PBS by 45 degrees;
   a focusing lens which focuses the laser pulse outputted from the Faraday rotator on the predetermined location in plasma; and
   a second reflecting mirror which reflects the laser pulse outputted from the focusing lens back along the incident laser pulse path and refocuses the laser pulse to the predetermined location in plasma.

3. The plasma diagnosis system according to claim 1, further comprising an optical isolator between the laser and the optical system, and wherein the optical isolator prevents any back reflected lights from feeding back into the laser.

4. The plasma diagnosis system according to claim 1, further comprising a trigger module which is configured with a photo detector and outputs a trigger signal when the photo detector detects a part of the laser pulse on a predetermined position,
   wherein a signal processing of the polychromator is synchronized by using the trigger signal.

5. The plasma diagnosis system according to claim 4, wherein the photo detector is placed between the laser and the optical system or at an arbitrary position where stray light reflected from or transmitted through an optical component is accessible and outputs the trigger signal when detecting that the laser pulse is supplied from the laser to the optical system, detecting that the laser pulse is supplied from the optical system to the plasma, or detecting that the laser pulse is supplied at an arbitrary position of the optical system.

6. Plasma diagnosis system according to claim 1, wherein the computer measures a pure Thomson scattering signal without the background noise by subtracting the background noise from the Thomson scattering signal contaminated with the background noise.

7. Plasma diagnosis system according to claim 1, wherein the computer measures temperature and density of electrons in plasma by analyzing the spectral characteristics obtained in the polychromator.

* * * * *